US008917819B2

(12) United States Patent
Paxinos et al.

(10) Patent No.: US 8,917,819 B2
(45) Date of Patent: Dec. 23, 2014

(54) METHOD AND APPARATUS FOR SPOKEN DIAGNOSTICS

(71) Applicants: Garry M Paxinos, Pompano Beach, FL (US); Anastasios Kyriakides, Hollywood, FL (US); Kenneth Alvin Hosfeld, Coral Spring, FL (US); Anastasios Nicholas Kyriakides, II, Plantation, FL (US)

(72) Inventors: Garry M Paxinos, Pompano Beach, FL (US); Anastasios Kyriakides, Hollywood, FL (US); Kenneth Alvin Hosfeld, Coral Spring, FL (US); Anastasios Nicholas Kyriakides, II, Plantation, FL (US)

( * ) Notice: Subject to any disclaimer, the term of this patent is extended or adjusted under 35 U.S.C. 154(b) by 0 days.

(21) Appl. No.: 14/057,459

(22) Filed: Oct. 18, 2013

(65) Prior Publication Data

US 2014/0112456 A1   Apr. 24, 2014

Related U.S. Application Data

(60) Provisional application No. 61/715,547, filed on Oct. 18, 2012.

(51) Int. Cl.
*H04M 1/24* (2006.01)
*H04M 3/08* (2006.01)
*H04M 3/22* (2006.01)
*H04M 3/493* (2006.01)

(52) U.S. Cl.
CPC ............ *H04M 3/2209* (2013.01); *H04M 3/493* (2013.01)
USPC ................... 379/27.07; 379/1.01; 379/26.02; 379/29.01

(58) Field of Classification Search
CPC ..... H04M 1/24; H04M 3/306; H04M 11/062; H04M 3/2209; H04M 3/30
USPC ........ 379/1.01, 9.02, 22, 26.01, 26.02, 27.01, 379/27.07, 28, 29.01
See application file for complete search history.

(56) References Cited

U.S. PATENT DOCUMENTS

| | | | |
|---|---|---|---|
| 6,754,310 B1 * | 6/2004 | Steinbrenner et al. ..... | 379/29.01 |
| 7,587,028 B1 * | 9/2009 | Broerman et al. ......... | 379/15.03 |
| 7,680,250 B1 * | 3/2010 | Zilles et al. ........................ | 379/9 |
| 2006/0280313 A1 * | 12/2006 | Schmidmer et al. ............. | 381/56 |
| 2009/0074153 A1 * | 3/2009 | Wu et al. ...................... | 379/1.04 |
| 2009/0307763 A1 * | 12/2009 | Rawlins et al. ................... | 726/5 |

FOREIGN PATENT DOCUMENTS

EP            1235416 A1 *  8/2002

* cited by examiner

*Primary Examiner* — Quoc D Tran
(74) *Attorney, Agent, or Firm* — The Keys Law Firm PLLC

(57) ABSTRACT

A method, apparatus and system to provide the ability for an analog telephone adapter (or other consumer electronics device) to provide spoken information to a consumer to help diagnose problems. The spoken diagnostics system and method for comprises a central analysis server and an analog telephone adapter ("ATA"). When in operation, when a consumer (as an end user) pick up a telephone which is connected to and/or operating through the ATA and enters a preset diagnostic code, defined a telephone number in one embodiment, the ATA and the central analysis server perform a series of diagnostic functions and cause one or more verbal messages relating to the status of the ATA as determined through the diagnostic functions to be spoken over the phone so as to be communicated to the consumer.

19 Claims, 3 Drawing Sheets

METHOD AND APPARATUS FOR SPOKEN DIAGNOSTICS

CROSS REFERENCE TO RELATED APPLICATIONS

This application claims the benefit of and incorporates by reference co-pending U.S. provisional patent application Ser. No. 61/715,547 filed Oct. 18, 2012.

BACKGROUND OF THE INVENTION

1. Field of the Invention

This invention relates generally to electronic device diagnostics and, more particularly, to a method and apparatus for initiating diagnostic functions on a networked electronic device and providing diagnostic information verbally.

2. Description of the Prior Art

In recent years, the use of Voice over Internet Protocol ("VoIP") services has increased dramatically. As VoIP systems typically interface with traditional PSTN, it is now well established that such systems allow for transparent telephone communications worldwide. One common way in which VoIP systems are configured is through the use of an analog telephone adapter ("ATA"), which is connected to and accesses the Internet either directly or through a computer and which includes a conventional phone jack to allow a traditional phone to be connected and operate in a manner which on the surface is very similar to traditional PSTN.

A problem which still exists, however, is that due to the various functionality being used or provided by an ATA at a given time, if an ATA is not functioning properly, it can be difficult to determine what aspect of the ATA is failing. This creates a situation where even the most basic errors, having very simple fixes, are unable to be easily and quickly identified by an end user and thus require the end user. For any issue causing an interruption or disruption in ATA function, the end user will typically have to contact service representatives and waste time waiting to speak with such a representative. And such is the best case because in some scenarios, when the ATA goes out, the end user's ability to contact a service representative by phone may be eliminated. Thus, there remains a need for a method and apparatus which could automatically perform diagnostic functions relating to the function of an ATA and provide spoken information relating to the results of the diagnostic functions. It would be helpful if such a spoken diagnostics method and apparatus was structured to provide on demand analysis of the operation of an ATA even if the ATA was not otherwise functioning properly. It would be additionally desirable for such a spoken diagnostics method and apparatus to be structured provide additional reference and/or information beyond any observed condition by way of URLs or recorded messages.

The Applicant's invention described herein provides for a method and apparatus adapted to facilitate spoken diagnostics of an ATA or other networked electronic device. The primary components of Applicants' spoke diagnostics method and apparatus include a remote central analysis server and an ATA connected to each other through an electronic data network. When in operation, the spoken diagnostics method and apparatus allows a user to initiate automatic diagnostic functions and be provided with spoken information concerning the diagnosed ATA. As a result, many of the limitations imposed by the prior art are removed.

SUMMARY OF THE INVENTION

A method, apparatus and system to provide the ability for an analog telephone adapter (or other consumer electronics device) to provide spoken information to a consumer to help diagnose problems. The spoken diagnostics system and method for comprises a central analysis server and an ATA. When in operation, when a consumer (as an end user) pick up a telephone which is connected to and/or operating through the ATA and enters a preset diagnostic code, defined a telephone number in one embodiment, the ATA and the central analysis server perform a series of diagnostic functions and cause one or more verbal messages relating to the status of the ATA as determined through the diagnostic functions to be spoken over the phone so as to be communicated to the consumer. In one embodiment, the ATA additionally includes a diagnostics button which directly causes the ATA to initiate its diagnostic function. In one embodiment, the ATA includes speakers built in or external speakers to allow it to audibly play the applicable one or more verbal messages relating to the status of the ATA.

Based on the results of the diagnostic functions performed between the ATA and the central analysis server, one or more of the following messages may be spoken: "OK" (operating normally within nominal metrics); "SIP port blocked, see (specified URL) for more information"; "Insufficient internet bandwidth—(quantity) mbps, see (specified URL) for more information"; "Unreliable internet connection—(quantity) % loss"; and "Unreliable internet connection—(quantity) ms jitter."

Under circumstances when a network connection with the central analysis server cannot be established or maintained, the ATA is adapted to perform diagnostic functions and provide applicable messages to the user in substantially the same manner as when a network connection is present.

In some embodiments, more detailed information may be spoken in addition to or in the alternative of relying on external URLs.

In some embodiments, the ATA will require the entry of a password or preset code in order to actuate the diagnostic functions.

In some embodiments, a plurality of discrete, preset diagnostic codes are provided and each of preset diagnostic code actuates a distinct set of diagnostics, including more advanced diagnostics.

In one embodiment, performance of the diagnostic functions will include user interactive question tree interface for allowing the user to supply particular information.

It is an object of this invention to provide a method and apparatus which could automatically perform diagnostic functions relating to the function of an ATA and provide spoken information relating to the results of the diagnostic functions.

It is another object of this invention to provide a spoken diagnostics method and apparatus structured to provide on demand analysis of the operation of an ATA even if the ATA was not otherwise functioning properly.

It is yet another object of this invention to provide a spoken diagnostics method and apparatus structured provide additional reference and/or information beyond any observed condition by way of URLs or recorded messages.

These and other objects will be apparent to one of skill in the art.

DETAILED DESCRIPTION OF THE INVENTION

Figure 1:
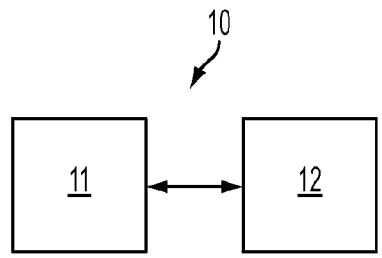
FIG. 1 shows a block diagram showing the component elements of a spoken diagnostics system built in accordance with the present invention.

Referring now to the drawings and in particular FIG. 1, a spoken diagnostics system 10 is shown as a central analysis server 11 and a networked electronic device. A networked electronic device built in accordance with the present invention can be one of many electronic devices having the capability to communicate data over the an electronic data network, such as the Internet, the capability to perform and quantify the results of diagnostic functions on itself and its network connection, and having electronic data concerning spoken messages associated with diagnostic results. A network electronic device built in accordance with the present invention is configured in its out of box state, or by way of added hardware and/or software to cause diagnostic functions to be performed, and cause spoke messages to be played concerning the results of performed diagnostic functions. In one embodiment, an ATA 12 defines the networked electronic device. In other embodiments, a media player/receiver or a mobile communications device define the networked electronic device. Under normal circumstances, the central analysis server 11 and the networked electronic device 12 are each connected to an electronic data network which at least allows them to communicate electronic data between each other. While such a connection allows for additional diagnostic functions to be performed, the ATA 12 is configured to perform its diagnostic functions and provide spoken messages related to the diagnostic functions regardless of whether a connection the electronic data network and the central analysis server 11 is available. In one embodiment, the Internet defines the electronic data network. It is appreciated that the central analysis server 11 may comprise a single computer or a plurality of computer which may be located in one location or in several locations.

Figure 2:
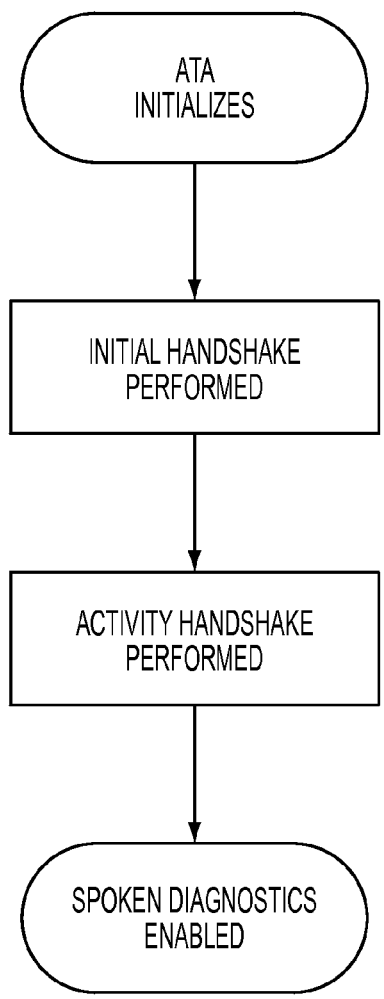
FIG. 2 shows a process of enhancing spoken diagnostics on a networked device built in accordance with the present invention.

Referring now to FIGS. 1 and 2, when an ATA 12 built in accordance with the present invention powers on or initializes its network communications at any time, it attempts to perform a series of handshakes with the central analysis server 11. The purpose of the handshakes with the central analysis server is to enhance the diagnostic functions available by enabling additional cross checking diagnostics to be performed from a remote network location.

During an initial handshake, it provides a unique identifier to the central analysis server 11 to allow the central analysis server 11 to identify the particular ATA 12. All data which is subsequently from the ATA 12 to the central analysis server 11 will include this identifier. Upon receiving the unique identifier, the central analysis server 11 confirms receipt of the identifier to the ATA and is provided with identification and operational data concerning the ATA 12. Such identification and operational data includes information relating to the device type, component version (hardware and software), the geographic distance from the central analysis server 11 and type of network connection. At this point, the central analysis server 11 provides to the ATA 12 electronic data concerning updates to the spoken messages in use for that device type (including component version) and their associated diagnostic result. The spoken message electronic data is based on known conditions and is typically manually entered to the central analysis server by an administrator.

Once the above described initial handshake is complete, the ATA 12 performs an activity handshake with the central analysis server 11. In one embodiment, the central analysis server 11 transmits a request for the activity handshake. In other embodiments, the ATA 12 initiates it on its own. During the activity handshake, the ATA 12 transmits electronic data which relating to its system activity, such as information relating to any hardware or software changes, and any network access activity, including information relating to the network addresses where the ATA 12 is transmitting receiving data to the central analysis server 11. In one embodiment, the central analysis server confirms receipt of the activity handshake data.

Once the handshakes are complete, as long as the network connection between the ATA 12 and the central analysis server 11 is present, the capabilities of the spoken diagnostics system on the ATA 12 are enhanced. Under such conditions, the ATA 12 seeks to maintain periodic contact with the central analysis server 11, enabling it to periodically update the central analysis server 11 of its system and network access activity through additional activity handshakes. If the handshakes were not successfully completed, the ATA 12 will simply utilize its own diagnostic functions capabilities and its preloaded spoken messages in performing the spoken diagnostics method.

As a part of the enhanced diagnostic function capabilities it provides, the central analysis server 11 is configured to perform diagnostic functions on remotely located ATAs 12 by way of its connection to the data network. In accordance with the same, when the central analysis server 11 is notified over the network that diagnostic functions have been requested, it references the activity handshake data as a baseline and cross checks the data points comprising the activity handshake data on file independently over the network. Then, the central analysis server 11 analyzes the results of the cross check of the activity handshake data with that of the information and operational data so that it can associate any diagnostic issues it discovers in the activity handshake data with specific error codes for transmission to the ATA 12.

The ATA 12 is configured to perform diagnostic functions on itself and its data network connection on a user initiating a request. In one embodiment, a request for the performance of diagnostic function can be initiated remotely over the data network.

Figure 3:
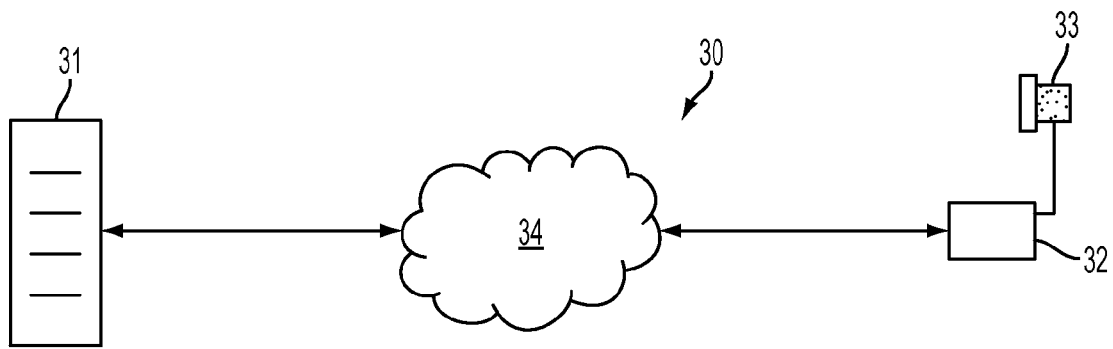
FIG. 3 shows a schematic diagram of the present invention embodied as an ATA built in accordance with the present invention connected to a telephone.

Referring now to FIG. 3, a spoken diagnostics system 30 can be provided in a variety of embodiments and configurations. In it understood that the components of such a system may connect to the Internet through any conventional means, including a serial or other connection to a computer, through a modem, directly or indirectly through a router (wired or wireless), or through a connection to a device configured to communicate electronic data over cellular networks. For example, one configuration of an embodiment of a spoken diagnostics system 30 is shown as a central analysis server 31, an ATA 32, and a conventional telephone 33. The central analysis server 31 and the ATA 32 are each connected to the Internet 34 which allows them to communicate data electronically between each other. In such an embodiment, the ATA 32 is configured to receive electrical power through a serial port on said ATA 32 and includes a analog telephone port to allow a telephone 33 to connect to it and operate from it. The telephone 33 is defined as a conventional, analog telephone set and connects to and operates from the ATA 32 through the ATA's 32 analog telephone port. In other embodiments, the ATA 32 connects to a device having an Internet connection through its serial port and receives power through the same connection, includes an Ethernet port to connect to a modem directly or indirectly and receives power through the serial port, includes a WiFi adapter to connect to a modem directly or indirectly and receives power through the serial port, and/or includes a near field communication receiver to connect to a device having an Internet connection or a modem directly or indirectly and receives power through the serial port. In this embodiment, it is contemplated that a user would initiate the process of providing spoken diagnostics on the ATA 31 by picking up the telephone 33 receiver and dialing a preset code on the telephone 33 keypad. In this embodiment, the ATA 32 would cause the telephone 33 receiver to broadcast any resulting spoken diagnostics message once the diagnostics were complete.

Figure 4:
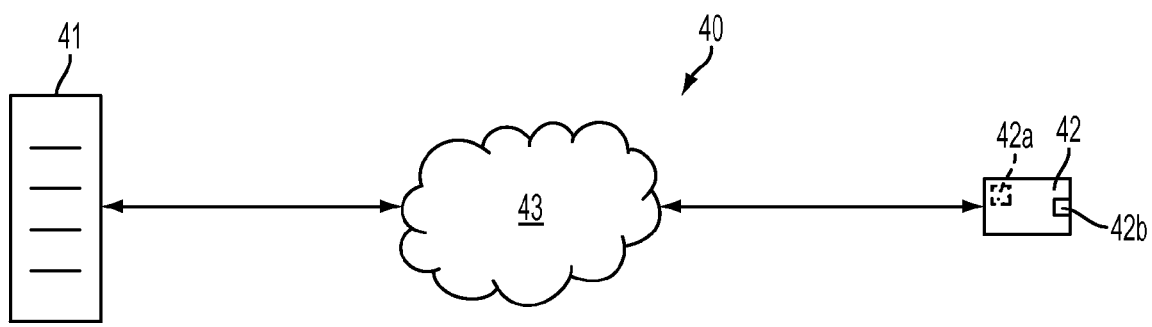
FIG. 4 shows a schematic diagram of the present invention embodied as a standalone ATA built in accordance with the present invention.

Referring now to FIG. 4, a spoken diagnostics system 40 is shown as a central analysis server 41 and an ATA 42. Here, the central analysis server 41 and the ATA 42 are again each connected to the Internet 43 which allows them to communicate data electronically between each other. In this embodiment, the ATA 42 includes a speaker 42*a* which allows the ATA 42 to broadcast spoken diagnostic messages directly and a actuator button 42*b* which allows a user to initiate a process of providing spoken diagnostics directly from the ATA 42. In this embodiment, the ATA 42 can be connected to the network and receive electrical power in the same manner as described above.

Figure 5:
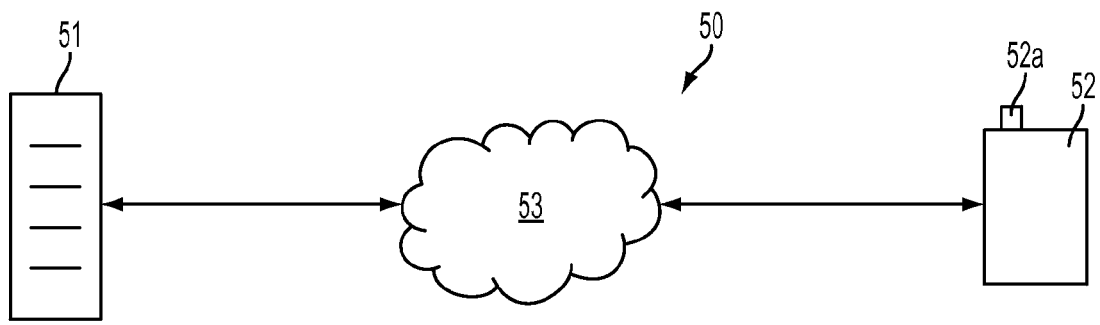
FIG. 5 shows a schematic diagram of the present invention embodied as a media receiver/player built in accordance with the present invention.

Referring now to FIG. 5, a spoken diagnostics system 50 is shown as a central analysis server 51 and an media player/receiver 52 configured in accordance with the present invention. The media player/receiver 52 can be any conventional media player/receiver, including a cable or satellite set top box or an Internet video streaming device. The media player/receiver 52 can be configured to operate in accordance with the present invention through its hardware and/or software in its out of box state, to be actuated through the built in user interfaces, or through the use of a USB plug 52*a* which contains the requisite hardware and software to allow a user to initiate the process of providing spoken diagnostics from the USB plug 52*a*, perform the process on the media player/receiver, and cause a spoken diagnostic message to be broadcast. The central analysis server 51 and the ATA 52 are again each connected to the Internet 53 so as to allow data to be communicated electronically between each other. In this embodiment, the media player/receiver 52.

Figure 6:
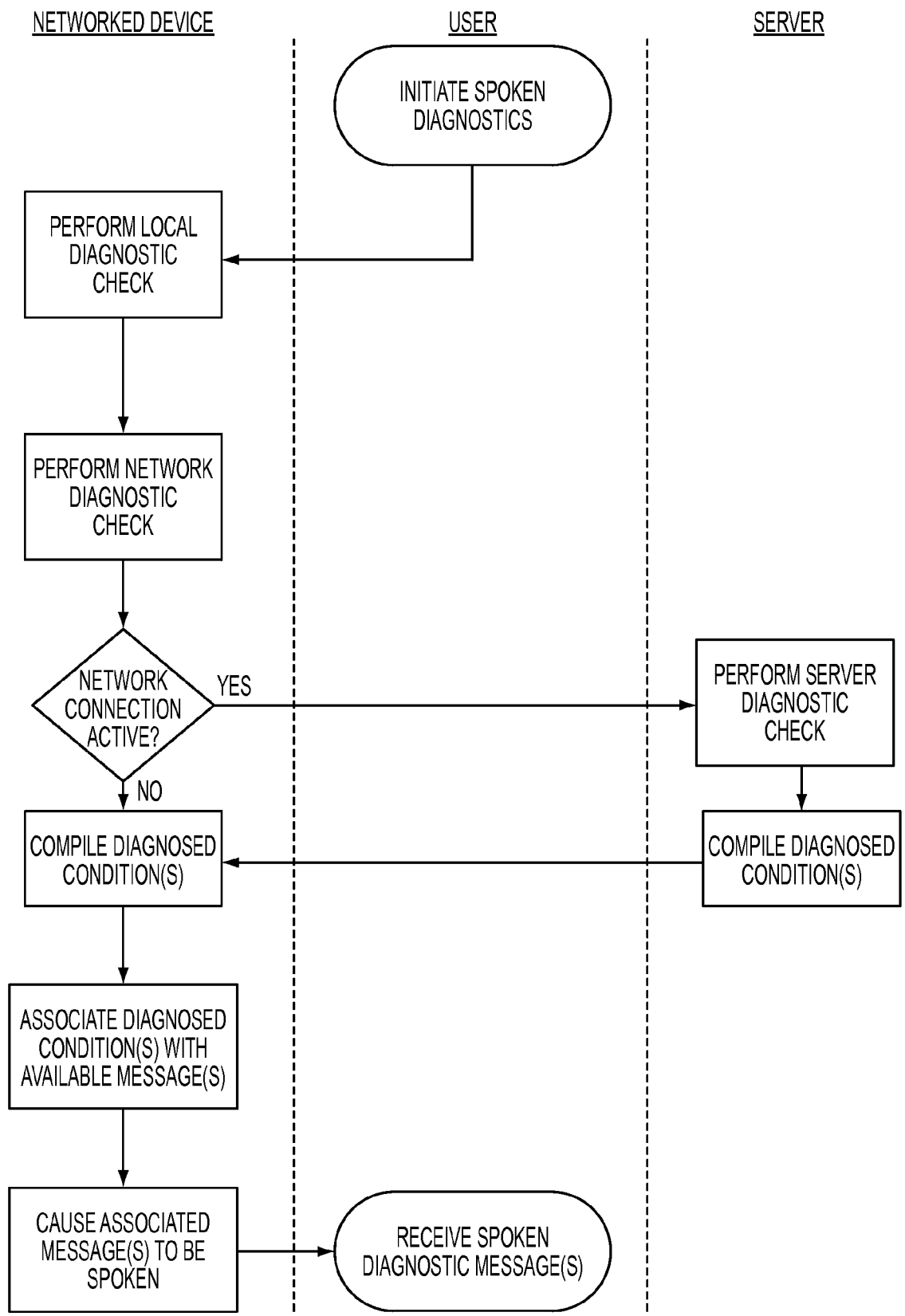
FIG. 6 shows a process of providing spoken diagnostics to a user from a networked device pairing a handheld electrical device with a entertainment system device to enable second screen control.

Referring now to FIG. 6, the process of providing spoken diagnostics is shown. When a spoken diagnostics function is initiated, either manually by a user or remotely from a central analysis server, the applicable networked device first performs its local diagnostics. During the local diagnostic check, the networked device checks for the presence and proper operation of its hardware components, software components, and direct electronic device connections (such as a telephone in the case of an ATA or a television in the case of a media receiver/player).

Next, the networked device performs the network diagnostic check. During the network diagnostic check, the networked device diagnoses network function, by checking areas such as restrictions on network access, the available bandwidth, the percent loss over the network, and for the presence of jitter over the network connection. If the networked device has an active network connection, the central analysis server then performs a server diagnostic check. The server diagnostic check includes having the central analysis server cross check the network connectivity of electronic devices with which the networked device has been or is attempting to communicate data with, enabling it to determine if any issues with such a network connection are originating at that destination. The server diagnostic check additionally includes cross checking hardware and software versions in use on the relevant networked device for known issues. Once the server diagnostic check is complete, the central analysis server compiles all diagnosed conditions to enable them to be cross referenced with an existing spoken diagnostics message on the networked device. This compiled server information is sent to the networked device.

Once the networked device receives the compiled server diagnosed conditions, or, if no network connection active, after the networked device completes its network diagnostic check, the networked device compiles all diagnosed conditions to enable them to be cross referenced with an existing spoken diagnostics message on the networked device. This compiled device information, along with any compiled server information, is then associated with available spoken diagnostics messages. The networked device then causes the spoken diagnostic messages which have been associated with diagnosed conditions to be broadcast so that a user can hear them.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for providing spoken diagnostics through a networked electronic device, comprising the steps of:

providing a local electronic device and a central analysis server, each configured to communicate data electronically over an electronic data network;

performing a local diagnostic check, wherein said local diagnostic check is performed at least in part by the central analysis server and includes at least one of confirming the presence and operation of internal hardware components, internal software components, and internal and external electronic connections of the local electronic device, enabling said local electronic device to diagnose problems in the operation of the local electronic device;

associating by at least one of said local electronic device and said central analysis server electronic data relating to diagnosed problems with at least one preset spoken diagnostics message, wherein a spoken diagnostics message is defined as a verbal communication containing information relating to problems in the local electronic device, remote electronic devices, or the electronic data network to which said local electronic device is connected; and causing by at least one of said local electronic device and said central analysis server at least one spoken diagnostics message which has been associated with electronic data relating to diagnosed problems to be broadcast, enabling the spoken diagnostics message to be heard by a user.

2. The method of claim 1, additionally comprising the step of performing by said local electronic device a network diagnostic check, wherein said network diagnostic check includes at least one of analyzing electronic data network connectivity for restrictions on network access and to determine the available bandwidth, the percent loss over the network, and the presence of jitter over the network connection, enabling said local electronic device to diagnose problems in the operation of the electronic data network.

3. The method of claim 1, additionally comprising the step of performing by said central analysis server a server diagnostic check, wherein said server diagnostic check includes analyzing electronic data network connectivity for destination electronic devices, defined as remote electronic devices with which the local electronic device has been or is attempting to communicate data with, enabling it to diagnose problems in electronic data network connectivity originating at that destination electronic devices.

4. The method of claim 1, additionally comprising the step of communicating by said local electronic device electronic data relating to diagnosed problems to said central analysis server.

5. The method of claim 1, wherein the step of associating electronic data relating to diagnosed problems with at least one preset spoken diagnostics message is performed at least in part by the central analysis server.

6. The method of claim 1, wherein the step of performing a local diagnostic check is performed by the central analysis server.

7. The method of claim 1, wherein the step of associating electronic data relating to diagnosed problems with at least one preset spoken diagnostics message is performed at least in part by the local electronic device.

8. The method of claim 1, wherein the step of causing at least one spoken diagnostics message which has been associated with electronic data relating to diagnosed problems to be broadcast is performed by the local electronic device.

9. The method of claim 1, wherein said local electronic device is an analog telephone adapter.

10. A system for providing spoken diagnostics through a networked electronic device, comprising:
 a local electronic device configured to be able to connect to an electronic data network;
 a central analysis server having a connection to the electronic data network and able to communicate data with said local electronic device electronically over said electronic data network;
 wherein said local electronic device is configured to perform at least one of performing a local diagnostic check, performing a network diagnostic check, associating electronic data relating to diagnosed problems with at least one preset spoken diagnostics message, and causing at least one spoken diagnostics message which has been associated with electronic data relating to diagnosed problems to be broadcast, enabling the spoken diagnostics message to be heard by a user;
 wherein said central analysis server is configured to perform, at least in part, at least one of performing a local diagnostic check and associating electronic data relating to diagnosed problems with at least one preset spoken diagnostics message;
 wherein said local diagnostic check includes at least one of confirming the presence and operation of internal hardware components, internal software components, and internal and external electronic connections of the local electronic device, enabling the diagnosis of problems in the operation of the local electronic device;
 wherein said network diagnostic check includes at least one of analyzing electronic data network connectivity for restrictions on network access and to determine the available bandwidth, the percent loss over the network, and the presence of jitter over the network connection, enabling the diagnosis of problems in the operation of the electronic data network; and
 wherein each of said spoken diagnostics messages is defined as a verbal communication containing information relating to problems in the local electronic device, remote electronic devices, or the electronic data network to which said local electronic device is connected.

11. The system of claim 10, wherein said central analysis server is additionally configured to perform a server diagnostic check and said server diagnostic check includes at least one of analyzing electronic data network connectivity for destination electronic devices, defined as remote electronic devices with which the local electronic device has been or is attempting to communicate data with, enabling it to diagnose problems in electronic data network connectivity originating at that destination electronic devices.

12. A method for providing spoken diagnostics through a networked electronic device, comprising the steps of:
 providing a local electronic device and a central analysis server, each configured to communicate data electronically over an electronic data network;
 performing by said local electronic device at least one of a local diagnostic check and a network diagnostic check, wherein said local diagnostic check includes at least one of confirming the presence and operation of internal hardware components, internal software components, and internal and external electronic connections of the local electronic device, enabling said local electronic device to diagnose problems in the operation of the local electronic device, and said network diagnostic check includes at least one of analyzing electronic data network connectivity for restrictions on network access and to determine the available bandwidth, the percent loss over the network, and the presence of jitter over the network connection, enabling said local electronic device to diagnose problems in the operation of the electronic data network;
 associating electronic data relating to diagnosed problems with at least one preset spoken diagnostics message, wherein a spoken diagnostics message is defined as a verbal communication containing information relating to problems in the local electronic device, remote electronic devices, or the electronic data network to which said local electronic device is connected and the step of associating electronic data relating to diagnosed problems with at least one preset spoken diagnostics message is performed at least in part by the central analysis server; and
 causing by at least one of said local electronic device and said central analysis server at least one spoken diagnostics message which has been associated with electronic data relating to diagnosed problems to be broadcast, enabling the spoken diagnostics message to be heard by a user.

13. The method of claim 12, wherein said local electronic device performs the local diagnostic check and the network diagnostic check.

14. The method of claim 12, additionally comprising the step of performing by said central analysis server a server diagnostic check, wherein said server diagnostic check includes at least one of analyzing electronic data network connectivity for destination electronic devices, defined as remote electronic devices with which the local electronic device has been or is attempting to communicate data with, enabling it to diagnose problems in electronic data network connectivity originating at that destination electronic devices.

15. The method of claim 14, additionally comprising the step of communicating by said local electronic device electronic data relating to diagnosed problems to said central analysis server.

16. The method of claim 12, wherein the step of causing at least one spoken diagnostics message which has been associated with electronic data relating to diagnosed problems to be broadcast is performed by the central analysis server.

17. The method of claim 12, wherein the step of associating electronic data relating to diagnosed problems with at least one preset spoken diagnostics message is performed by the central analysis server.

18. The method of claim 12, wherein the step of causing at least one spoken diagnostics message which has been associated with electronic data relating to diagnosed problems to be broadcast is performed by the local electronic device.

19. The method of claim 12, wherein said local electronic device is an analog telephone adapter.

\* \* \* \* \*